Patented Jan. 26, 1943

2,309,483

UNITED STATES PATENT OFFICE 2,309,483

ORGANIC MATERIAL AND THE PREPARATION THEREOF

Joseph Abrahm Valentine Turck, Jr., New York, N. Y., assignor to Colgate-Palmolive-Peet Company, Jersey City, N. J., a corporation of Delaware No Drawing. Application December 6, 1940, Serial No. 368,869

12 Claims. (Cl. 252—1)

The present invention is directed to the preparation of new and unusual organic materials from tall oil, and more particularly it relates to the production of aromatic materials by the hydrogenation of the unsaponifiable material separated from tall oil and related materials.

As is generally known, tall oil has a very strong acrid odor which makes it unsuitable for many purposes. The unsaponifiable material separated from tall oil also has a distinctive and unpleasant odor somewhat different from that of the tall oil. This unsatisfactory odor has prevented the employment of these unsaponifiables for any useful purpose.

It has now been found that the tall oil unsaponifiable material and related substances can be converted into new and valuable organic materials having unusual and unpredictable properties.

The process of this invention in general comprises the separation of the unsaponifiable materials from tall oil followed by the hydrogenation of these unsaponifiable materials to form light colored stable substances having a pleasant pine or cedarwood odor. The hydrogenated fraction may be fractionated to yield a more concentrated aromatic material and a substantially odorless and relatively non-volatile fraction.

The unsaponifiable material may be separated from the tall oil soap by a number of methods. One desirable method is to distill it from the molten anhydrous soap by blowing steam or other inert gas therethough under substantially non-oxidizing conditions with or without the aid of reduced pressure. The unsaponifiable material may be fractionally condensed from the steam, as it may be condensed with the steam and separated from the water by decanting and/or extracting. Another method of recovering the unsaponifiable material from tall oil soap is to solvent extract the dry soap or an aqueous solution thereof with a water immiscible solvent such as ethyl ether, gasoline, petroleum ether, dichlorethane, carbon tetrachloride and the like. The unsaponifiable material is recovered by evaporation of the solvent from the extact. The nature and composition of the saponifiable material from these two methods of recovering are somewhat different, but it has been found that upon hydrogenation, similar products having the desirable aromatic properties can be prepared from the materials obtained by either of these procedures.

The unsaponifiable material may be purified by crystallization, distillation, alkali treatment or the like before hydrogenation. It may be fractionated, e. g. by fractional distillation, and the individual fractions hydrogenated.

The hydrogenation may be conducted in a batch or continuous manner. In a batch process the unsaponifiable material is placed in a hydrogenation autoclave along with a small amount of hydrogenation catalyst such as nickel suspended on kieselguhr, Raney nickel, platinum, palladium, and mixtures thereof. The autoclave is sealed and evacuated. Hydrogen is introduced into the autoclave until the pressure is above atmospheric. The autoclave is again evacuated in order to remove residual air from the system. The autoclave is then filled with hydrogen to a substantial pressure, preferably above 50 pounds per square inch, for example 600 pounds per square inch at about room temperature, but much higher pressures show many advantages if suitable equipment is available. The contents of the autoclave are then agitated while raising the pressure in the chamber at a constant rate. With a nickel-kieselguhr catalyst, the temperature should be raised until hydrogen absorption takes place at a substantial rate, which will be at a temperature of 155° C. or higher. The hydrogenation is continued as long as a change in pressure indicates hydrogen absorption. The autoclave is then permitted to cool and the pressure is released. The product removed from the autoclave is light in color, has a strongly aromatic odor and an oily appearance.

As stated, the above temperatures apply to the use of a nickel catalyst which may be prepared by precipitating nickelous carbonate or oxycarbonate on kieselguhr, drying the impregnated earth at about 105° C., powdering the dried product, and finally reducing the mixture in a current of hydrogen at 400° C. for about two hours. The nickel content of the product should be about 9 to 15%, e. g. 14%. Although the nickel catalysts alone or admixed with small proportions of the noble metals are the preferred catalysts, it is also possible to employ the noble metals alone. However, the latter materials are generally expensive for large scale production and are usually more readily poisoned. The process may be similarly operated with other hydrogenation catalysts than nickel, but other temperature and pressure conditions may be necessary.

The hydrogenation process may be conducted in a continuous countercurrent manner. The preheated unsaponifiable material is passed into the top of a jacketed corrosion-resistant tower packed with granular catalysts and/or catalyst screens. Hydrogen gas, preferably at the reaction temperature, is introduced into the bottom of the tower and flows upwardly countercurrent to the downwardly flowing unsaponifiable material under treatment. The non-reacted gas is removed at the top and may be purified and recycled for further use. The hydrogenated unsaponifiable material is continuously removed from the bottom of the hydrogenation tower. It is desirable to operate the tower under pressure in order to expedite hydrogenation and to prevent volatilization of the low boiling unsaponifiable constituents. The following examples are for the purpose of illustrating the present invention but are not intended to be limiting on the scope thereof.

*Example I*

100 parts by weight of the unsaponifiable portion of tall oil having a boiling range of between about 80° C. and 320° C. at 5 mm. pressure and obtained by steam distillation of the molten, anhydrous tall oil soaps, and 2 parts by weight of 14% nickel-kieselguhr catalyst are placed in a glass lined pressure hydrogenation bomb. The bomb is assembled and evacuated. Hydrogen gas is introduced into the bomb until a pressure of about 65 pounds per square inch absolute is built up. The pressure is released and the bomb evacuated in order to sweep out residual air from the system. The bomb is then filled again with hydrogen gas to a pressure of about 700 pounds per square inch at room temperature. The bomb is then rocked mechanically to agitate the unsapanifiable material while the temperature is raised to about 185° C. The product of the unsaponifiable material will then begin to absorb hydrogen. The treatment is continued for about four hours. The bomb is cooled and the pressure released. The hydrogenated unsaponifiable product removed from the bomb is light colored and has a pleasant pine-like odor which is strong and lasting. This material is fractionally distilled to obtain an aromatic fraction which boils between about 85° C. and 140° C. at 5 mm. pressure and comprises about 10% of the total mixture, and a higher boiling substantially odorless, colorless material which is valuable as a perfume fixative.

*Example II*

The process of Example I is repeated by employing distilled unsaponifiable material from which the dark colored residue has been separated. The temperature of treatment is about 170° C., which is slightly lower than that employed for the undistilled material, since initial hydrogen absorption with the former material was found to be at a somewhat lower temperature. However, higher temperatures, e. g. those above 200° C., may be advantageously employed. The product of the hydrogenation is substantially colorless and has a similar concentrated cedarwood or pine-like odor.

The total mixture or the aromatic fraction is very desirable as a perfume for various purposes. Because of the low cost of the raw material and the processing involved, the product may be used wherever an inexpensive perfume is desired. Because of its stability, it may be used with alkaline, acid or neutral materials. For example, it may be used as a reodorant or as a perfume with soap (cakes, beads, powders, chips or creams), bath salts, sulphonate derivatives, rubber, synthetic rubber, plastics or the like.

The total product or the high boiling non-aromatic fraction may be used as a perfume base or fixative, or as a plasticizer for synthetic resins, synthetic rubber, cellulose esters and other plastic materials. It may also be employed in lubricating compositions, cosmetics, or in related materials.

The unsaponifiable material may be obtained from any source related to the sulphate tall oil supply, although the latter source is preferable. For example, it may be recovered from the unsaponifiable residues or high boiling fractions from turpentine distillation, from gum or wood rosin, from sulphite tall oil, and/or from other similar fractions of the pinus and related coniferous trees, which unsaponifiable fractions boil at temperatures above 60° C. at 5 mm. pressure.

The unsaponifiable material may be purified before and or after hydrogenation by one or more suitable treatments such as distillation, distillation over alkali, fractional distillation, aqueous alakli extraction or the like.

As many widely different embodiments may be made without departing from the spirit or scope thereof, it is to be understood that this application is not limited to the specific proportions or embodiments herein disclosed except as defined in the following claims.

I claim:

1. The process which comprises treating tall oil unsaponifiable material having a boiling point not less than 60° C. at 5 mm. pressure, with hydrogen in the presence of a hydrogenation catalyst and at an elevated temperature.

2. The process which comprises treating unsaponifiable material having a boiling point not less than 60° C. at 5 mm. pressure obtained by separation from naturally-occurring organic carboxylic acids recovered from pinus and related coniferous trees, with hydrogen in the presence of a hydrogenation catalyst and at an elevated temperature.

3. The process which comprises treating tall oil unsaponifiable material having a boiling point not less than 60° C. at 5 mm. pressure, with hydrogen in the presence of a nickel hydrogenation catalyst and at a temperature above 155° C.

4. The process which comprises treating unsaponifiable material having a boiling point not less than 60° C. at 5 mm. pressure obtained by separation from naturally-occurring organic acids recovered from pinus and related coniferous trees, with hydrogen in the presence of a nickel hydrogenation catalyst and at a temperature above 155° C., and fractionating the resulting product to concentrate the aromatic portion.

5. The process which comprises treating tall oil unsaponifiable material having a boiling point not less than 60° C. at 5 mm. pressure, with hydrogen in the presence of a hydrogenation catalyst, at an elevated temperature, and at a pressure above 50 pounds per square inch, and fractionally distilling the resulting product to concentrate the aromatic portion.

6. The process which comprises treating unsaponifiable material having a boiling point not less than 60° C. at 5 mm. pressure obtained by separation from naturally-occurring organic acids recovered from pinus and related coniferous trees, with hydrogen in the presence of a hydrogenation catalyst, at an elevated temperature, and at a pressure above 50 pounds per square inch.

7. The process which comprises treating tall oil unsaponifiable material having a boiling point not less than 60° C. at 5 mm. pressure, with hydrogen in the presence of a nickel hydrogenation catalyst, at an elevated temperature not less than 155° C., and at a hydrogen pressure of at least 50 pounds per square inch.

8. The process which comprises treating unsaponifiable material having a boiling point not less than 60° C. at 5 mm. pressure obtained by separation from normally-occurring organic acids recovered from pinus and related coniferous trees, with hydrogen in the presence of a nickel hydrogenation catalyst, at an elevated temperature not less than 155° C., and at a pressure of at least 50 pounds per square inch.

9. The process which comprises treating tall oil unsaponifiable material having a boiling point not less than 60° C. at 5 mm. pressure, with hydrogen in the presence of a hydrogenation catalyst, at an elevated pressure, and at a temperature above 200° C.

10. The process which comprises reacting unsaponifiable material having a boiling point not less than 60° C. at 5 mm. pressure obtained by separation from normally-occurring organic acids recovered from pinus and related coniferous trees, with hydrogen in the presence of a hydrogenation catalyst, at an elevated pressure, and a temperature above 200° C.

11. The process which comprises treating tall oil unsaponifiable material having a boiling point not less than 60° C. at 5 mm. pressure, with hydrogen in the presence of a nickel hydrogenation catalyst, at a temperature not less than 200° C., and at a pressure of at least 600 pounds per square inch.

12. The process which comprises treating unsaponifiable material having a boiling point not less than 60° C. at 5 mm. pressure obtained by separation from normally-occurring organic acids recovered from pinus and related coniferous trees, with hydrogen in the presence of a nickel hydrogenation catalyst, at a temperature not less than 200° C., and at a pressure of at least 600 pounds per square inch.

JOSEPH ABRAHM VALENTINE TURCK, Jr.